US010632699B2

(12) United States Patent
Asper et al.

(10) Patent No.: US 10,632,699 B2
(45) Date of Patent: Apr. 28, 2020

(54) BLADDER RINGS FOR TIRE VULCANIZATION MOLD

(71) Applicant: Bridgestone Americas Tire Operations, LLC, Nashville, TN (US)

(72) Inventors: Robert W. Asper, Wadsworth, OH (US); Adam K. Nesbitt, Akron, OH (US); Jason R. Barr, Akron, OH (US); Hans R. Dorfi, Akron, OH (US); John R. Lewis, Hudson, OH (US); Hyeonjae Kim, Hudson, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 94 days.

(21) Appl. No.: 15/737,844

(22) PCT Filed: Jun. 27, 2016

(86) PCT No.: PCT/US2016/039535
§ 371 (c)(1),
(2) Date: Dec. 19, 2017

(87) PCT Pub. No.: WO2016/210406
PCT Pub. Date: Dec. 29, 2016

(65) Prior Publication Data
US 2019/0001599 A1    Jan. 3, 2019

Related U.S. Application Data

(60) Provisional application No. 62/184,299, filed on Jun. 25, 2015.

(51) Int. Cl.
*B29D 30/06*    (2006.01)

(52) U.S. Cl.
CPC ...... *B29D 30/0654* (2013.01); *B29D 30/0645* (2013.01); *B29D 2030/0657* (2013.01); *B29D 2030/0659* (2013.01)

(58) Field of Classification Search
CPC ............ B29D 30/0645; B29D 30/0649; B29D 30/0654; B29D 2030/0657; B29D 2030/0659
(Continued)

(56) References Cited

U.S. PATENT DOCUMENTS 2,736,059 A * 2/1956 Frank ................. B29D 30/0645
425/33
2,880,454 A    4/1959 Brundages
(Continued)

FOREIGN PATENT DOCUMENTS

EP    0489268    6/1992
EP    1398183    6/2008
(Continued)

OTHER PUBLICATIONS

International Search Report and Written Opinion; corresponding PCT Application No. PCT/US2016/039535; filed Jun. 27, 2016; Authorized Officer Kang; dated Sep. 30, 2016.
(Continued)

*Primary Examiner* — James P Mackey
(74) *Attorney, Agent, or Firm* — Shaun J. Fox; Bryan Jaketic

(57) ABSTRACT

A tire mold has a cavity with a flexible bladder disposed in a central portion of the cavity. The tire mold further includes a first ring connected to a first end of the flexible bladder, and a second ring connected to a second end of the flexible bladder. At least one of the first and second rings is configured to move between a first position and a second position. The flexible bladder is stretched to a maximum axial length when the first and second rings are in a first position. When the first and second rings are in the first position the sum of the first axial length and second axial length is greater than a space between the first ring and the second ring.

8 Claims, 7 Drawing Sheets

(58) Field of Classification Search
USPC .................................. 425/43, 48, 52, 58
See application file for complete search history.

(56) References Cited

U.S. PATENT DOCUMENTS

| | | | |
|---|---|---|---|
| 3,640,653 | A | 2/1972 | Laenen et al. |
| 3,712,769 | A | 1/1973 | Cimprich |
| 3,902,831 | A | 9/1975 | Fujieda et al. |
| 4,608,219 | A | 8/1986 | Singh et al. |
| 4,670,209 | A | 6/1987 | Nakagawa et al. |
| 4,877,469 | A | 10/1989 | Szyms et al. |
| 5,165,939 | A | 11/1992 | Pizzomo |
| 6,217,307 | B1 * | 4/2001 | Yu ................ B29D 30/0645 425/48 |
| 6,363,989 | B1 | 4/2002 | Phelps et al. |
| 6,416,305 | B1 | 7/2002 | Singh |
| 6,620,367 | B1 | 9/2003 | Mitamura |
| 6,770,229 | B2 | 8/2004 | Cole |
| 6,908,584 | B2 | 6/2005 | Cole |
| 7,281,916 | B2 | 10/2007 | Ito |
| 7,661,944 | B2 * | 2/2010 | Ichimaru ........... B29D 30/0603 425/43 |
| 7,987,697 | B2 | 8/2011 | Pickel |
| 8,114,335 | B2 | 2/2012 | Conger et al. |
| 8,506,276 | B2 | 8/2013 | Tanno et al. |
| 8,596,322 | B2 | 12/2013 | Stoila et al. |
| 2008/0084007 | A1 | 4/2008 | Szyms |
| 2010/0032079 | A1 * | 2/2010 | Marchini ........... B29D 30/0601 156/111 |
| 2010/0089520 | A1 | 4/2010 | Maus et al. |
| 2013/0087953 | A1 | 4/2013 | Rodgers et al. |

FOREIGN PATENT DOCUMENTS

| | | |
|---|---|---|
| EP | 2289692 | 3/2011 |
| JP | 2006150678 | 6/2006 |
| JP | 2006231615 | 9/2006 |
| JP | 2007076268 | 3/2007 |
| JP | 2007331200 | 12/2007 |
| JP | 2012086580 | 5/2012 |
| JP | 5052335 | 10/2012 |
| WO | 2010128566 | 11/2010 |
| WO | 2014099458 | 6/2014 |

OTHER PUBLICATIONS

Rockwell Automation; Tire Building Machine: Reduce Design Time and Improve TCO for Tire Manufacturers; URL: http://literature.rockwellautomation.com/idc/groups/literature/documents/wp/tire-wp002_-en-p.pdf; 2013. The year of publication is sufficiently earlier than the effective U.S. filing date and any foreign priority date. MPEP 609.04 (a).

AMCL Machinery Ltd.; Tyre Curing Presses: Aubo Range; URL: http://www.amcl.in/images/products/downloads/aubo%20range.pdf. The year of publication is sufficiently earlier than the effective U.S. filing date and any foreign priority date. MPEP 609.04(a).

* cited by examiner

BLADDER RINGS FOR TIRE VULCANIZATION MOLD

FIELD OF INVENTION

The disclosure generally relates to bladder rings for a tire vulcanization mold. More particularly, the disclosure relates to bladder rings having particular dimensions or spacing to support a bladder in a tire vulcanization mold.

BACKGROUND

Generally, tires are molded in a vulcanization mold that heats a green tire while pressing an outer surface of the green tire against an inner surface of the vulcanization mold. The green tire is placed in a cavity of the vulcanization mold, about a bladder. To receive the green tire, the bladder is initially placed in an axially extended state. After the green tire is disposed about the bladder, the bladder is then axially contracted so that the entire bladder is disposed within a cavity of the green tire. A hot pressure medium such as steam is then pressure injected into the bladder, thereby expanding the bladder in a radial direction. Due to this radial expansion, the bladder presses the green tire against the inner surface of the vulcanization mold.

SUMMARY OF THE INVENTION

In one embodiment, a tire vulcanization mold includes a plurality of mold surfaces defining a tire cavity, and a center post disposed in the tire cavity. The mold further includes a first ring disposed about the center post. The first ring has a first diameter and a first axial length. The mold also has a second ring disposed about the center post. The second ring has a second diameter equal to the first diameter, and a second axial length. The mold further includes a bladder having a first end connected to the first ring and a second end connected to the second ring. At least one of the first and second rings is configured to move axially along the center post between a first, extended position in which the first ring is distal from the second ring and a second, compressed position in which the first ring is proximate to the second ring. When the first and second rings are in the first, extended position the sum of the first axial length and second axial length is greater than a space between the first ring and the second ring. The mold also includes a vacuum configured to apply vacuum pressure to an inside of the bladder when the first and second rings are in the first, extended position. The mold further includes a hot pressure medium supply configured to provide a hot pressure medium to the inside of the bladder when the first and second rings are in the second, compressed position.

In another embodiment, tire mold has a cavity with a flexible bladder disposed in a central portion of the cavity. The tire mold further includes a first ring connected to a first end of the flexible bladder, and a second ring connected to a second end of the flexible bladder. At least one of the first and second rings is configured to move between a first position and a second position. The flexible bladder is stretched to a maximum axial length when the first and second rings are in a first position. When the first and second rings are in the first position the sum of the first axial length and second axial length is greater than a space between the first ring and the second ring.

In yet another embodiment, a bladder ring assembly for a tire vulcanization mold includes a first bladder ring configured to engage a first end of a bladder and a second bladder ring configured to engage a second end of the bladder. The first bladder ring has a first annular portion with a first diameter D1 and a first axial length L1, wherein $L1 \geq 4 \times D1$. The second bladder ring has a second annular portion with a second diameter D2 and a second axial length L2, wherein $L2 \geq 4 \times D2$.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms that may be employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

While the directions defined above are made with reference to a tire, it should be understood that they may also refer to a tire cavity of a tire mold.

Figure 1B:
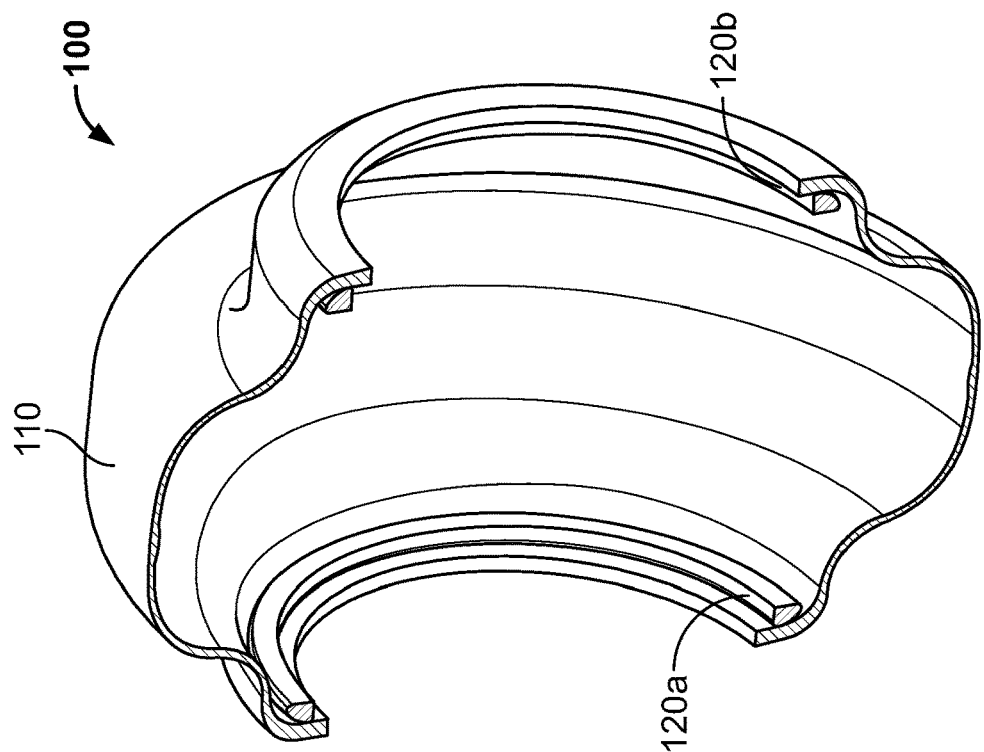
FIGS. 1A-1B illustrate a cutaway of a prior art embodiment of a bladder ring assembly for a tire mold, with the rings in extended and compressed positions, respectively.
Figure 1A:
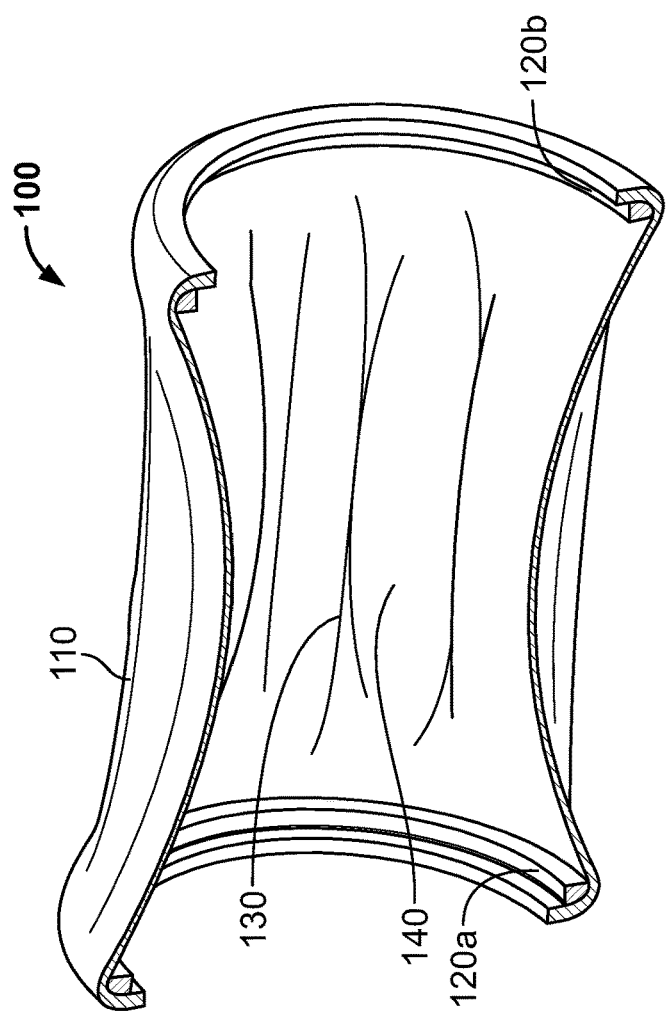

FIGS. 1A and 1B show a cutaway of an exemplary prior art embodiment of a bladder ring assembly 100 for a tire mold. The bladder ring assembly 100 includes a flexible bladder 110 having a first end connected to a first bladder ring 120a and a second end connected to a second bladder ring 120b. The first and second bladder rings 120a,b are disposed about a center post (not shown), and are configured to be moved with respect to each other along the center post.

In one embodiment, the first bladder ring 120a is fixed with respect to the center post, and only the second bladder ring 120b translates along the center post. In another embodiment, both the first and second bladder rings 120a,b translate along the center post. In both embodiments, the first and second rings 120a,b move relative to each other between an axially extended position in which the first ring is distal from the second ring (as shown in FIG. 1A) and an axially compressed position in which the first ring is proximate to the second ring (as shown in FIG. 1B).

When the bladder ring assembly 100 is in the axially extended position, vacuum pressure may be applied to the interior of the bladder 110 to reduce the diameter of the bladder. The vacuum pressure may cause lobes 130 to form on the surface of the bladder 110, with adjacent lobes 130 being separated by a valley 140. When the bladder ring assembly 100 is in the axially extended position, it is configured to receive a green tire (not shown). After the green tire is disposed about the bladder 110, the first and second bladder rings 120a,b are moved to the axially compressed position so that the bladder 110 is axially contracted to be disposed within a cavity of the green tire. A hot pressure medium such as steam is then pressure injected into the bladder 110, thereby further expanding the bladder 110 in a radial direction.

Figure 2B:
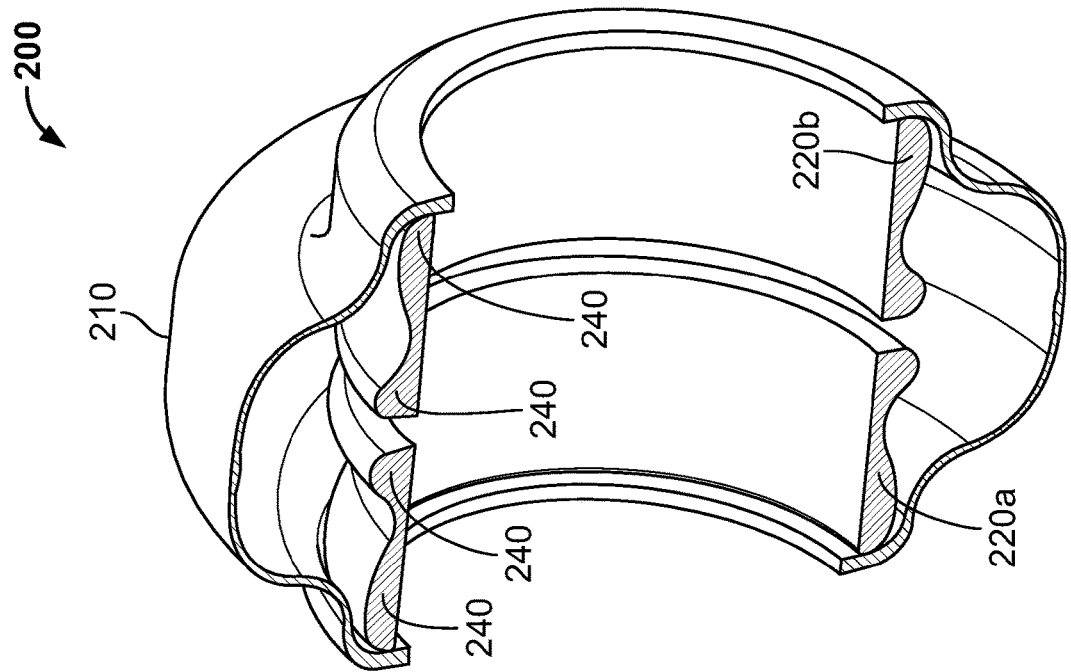
FIGS. 2A-2B illustrate a cutaway of one embodiment of a bladder ring assembly for a tire mold, with the rings in extended and compressed positions, respectively.
Figure 2A:
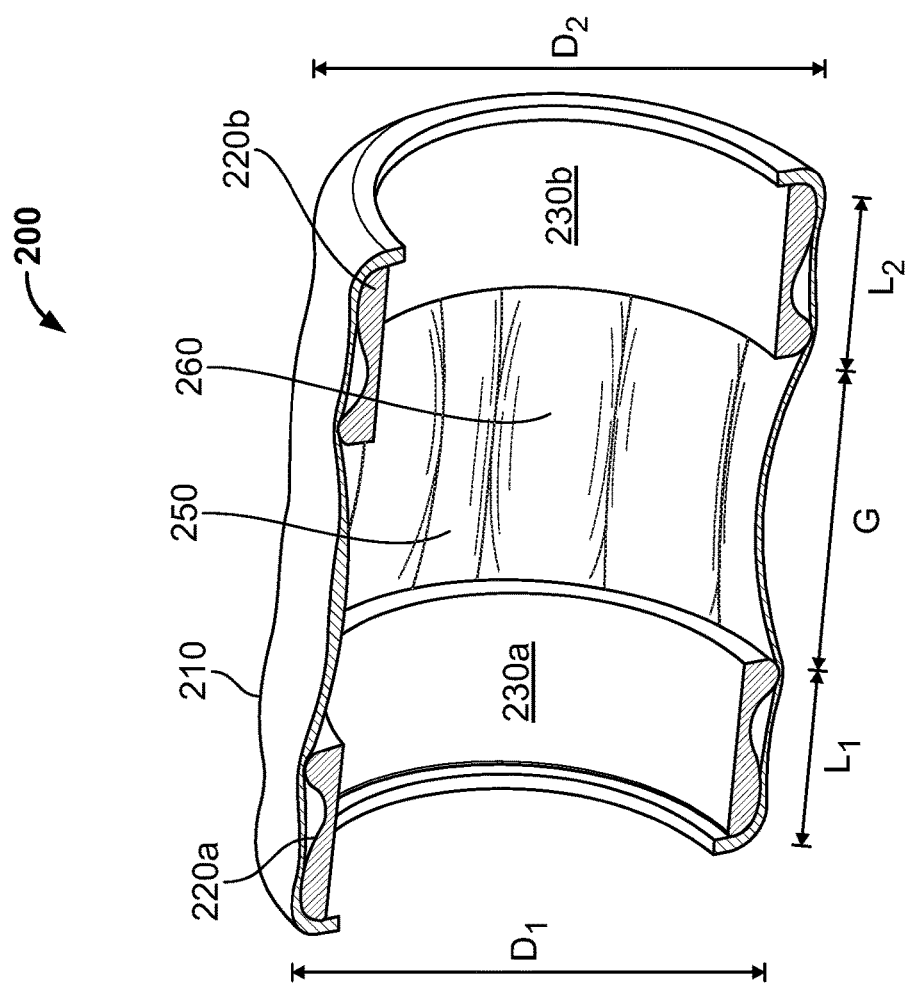

FIGS. 2A and 2B show a cutaway of one embodiment of a bladder ring assembly 200 for a tire mold. The bladder ring assembly 200 includes a flexible bladder 210 having a first end connected to a first bladder ring 220a and a second end connected to a second bladder ring 220b. The first bladder ring 210a has a first annular portion 230a with a first diameter $D_1$ and a first axial length $L_1$. The second bladder ring 210b has a second annular portion 230b with a second diameter $D_2$ and a second axial length $L_2$. In the illustrated embodiment, each of the first and second annular portions 230a,b includes a plurality of ridges 240 that run circumferentially along an external surface of the annular portion. In the illustrated embodiment, the first and second annular portions 230a,b are solid portions. In an alternative embodiment (not shown), the first and second annular portions may include a plurality of apertures.

The first diameter $D_1$ is equal to the second diameter $D_2$. In the illustrated embodiment, the first axial length $L_1$ is also equal to the second axial length $L_1$. In an alternative embodiment (not shown), the first axial length is different from the second axial length. In one known embodiment, the first and second diameters $D_1$, $D_2$ are between 16 to 22 inches (40 to 55 centimeters). In other embodiments, the first and second diameters $D_1$, $D_2$ may be between 4 to 80 inches (10 to 200 centimeters). Additionally, in one known embodiment, the first and second axial lengths $L_1$, $L_2$ are between 2 to 8 inches (5 to 20 centimeters). In other embodiments, the first and second axial lengths $L_1$, $L_2$ may be between 2 to 60 inches (5 to 150 centimeters). In one embodiment, a ratio of the first diameter $D_1$ to the first axial length $L_1$ is less than 4:1, and a ratio of the second diameter $D_2$ to the second axial length $L_2$ is likewise less than 4:1. In other words, $D_1 < 4 \times L_1$ and $D_2 < 4 \times L_2$.

The first and second bladder rings 220a,b are disposed about a center post (not shown), and are configured to be moved with respect to each other along the center post. In one embodiment, the first bladder ring 220a is fixed with respect to the center post, and only the second bladder ring 220b translates along the center post. In another embodiment, both the first and second bladder rings 220a,b translate along the center post. In both embodiments, the first and second rings 220a,b move relative to each other between an axially extended position in which the first ring is distal from the second ring (as shown in FIG. 2A) and an axially compressed position in which the first ring is proximate to the second ring (as shown in FIG. 2B).

When the bladder ring assembly 200 is in the axially extended position, the bladder 210 is stretched to a maximum axial length and the first bladder ring 220a is separated from the second bladder ring 220b by a gap G. In the illustrated embodiment, the sum of the first axial length $L_1$ and second axial length $L_2$ is greater than the gap G. In one embodiment, the sum of the first axial length $L_1$ and second axial length $L_2$ is approximately 1.5 times greater than the gap G. In alternative embodiments, the sum of the first axial length $L_1$ and second axial length $L_2$ ranges from 0.5 times the gap G to 5 times the gap G. In another alternative embodiment, the first axial length $L_1$ is at least 40% of the maximum axial length of the bladder 210 and the second axial length $L_2$ is also at least 40% of the maximum axial length of the bladder 210.

In the illustrated embodiment, when the first and second bladder rings 220a,b are in the axially compressed position, they are still separated by a small gap. In an alternative embodiment (not shown), the first bladder ring contacts the second bladder ring in the axially compressed position.

When the bladder ring assembly 200 is in the axially extended position, vacuum pressure is applied to the interior of the bladder 210 to reduce the diameter of the bladder. The vacuum pressure causes lobes 250 to form on the surface of the bladder 210, with adjacent lobes 250 being separated by a valley 260. The axial lengths and the external annular surfaces of the bladder rings 220a, 220b may be selected to reduce the number of lobes 250 that are formed in the bladder 210. The axial lengths and the external annular surfaces of the bladder rings 220a, 220b may also be selected to reduce the depths of the valleys 260 that are formed in the bladder 210. Testing has shown that reducing the number of lobes or reducing the depths of the valleys on a bladder in the axially extended position reduces the amount of strain on the bladder and therefore may extend the life of the bladder. Additionally, the axial lengths and the external annular surfaces of the bladder rings 220a, 220b may also be selected to reduce the amount of strain on the first and second ends of the bladder 210.

Figure 3:
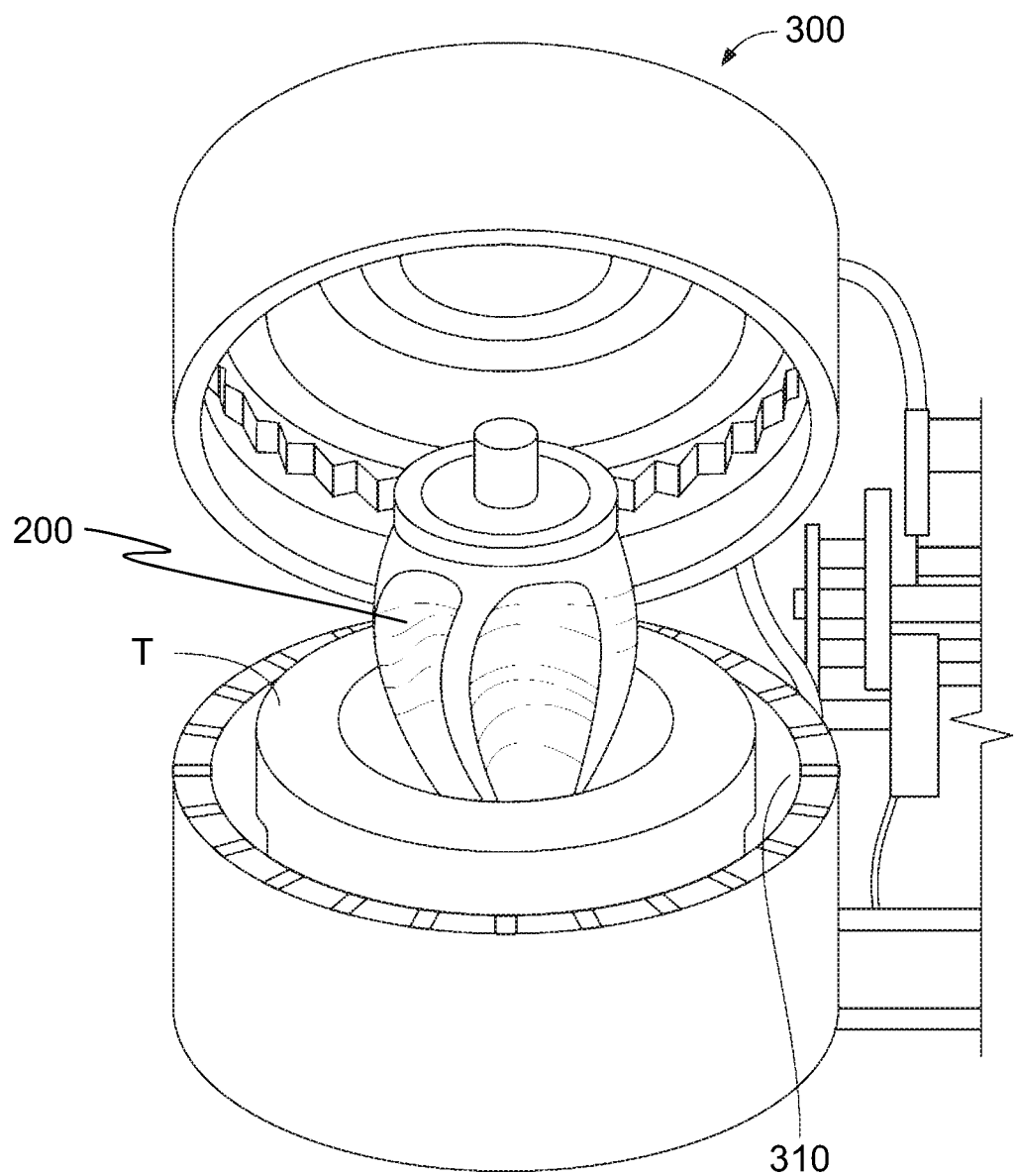
FIG. 3 illustrates a perspective view of a tire mold with the bladder ring assembly of FIGS. 2A-2B.

FIG. 3 shows a perspective view of a tire mold 300 with the bladder ring assembly 200 in the axially extended position. The tire mold 300 includes a vacuum (not shown) that applies vacuum pressure to the inside of the bladder ring assembly 200. When the bladder ring assembly 200 is in the axially extended position, it is configured to receive a green tire T in a tire cavity defined by the interior surfaces of the tire mold 300. After the green tire T is disposed about the bladder ring assembly 200, the first and second bladder rings are moved to the axially compressed position so that the bladder is axially contracted to be disposed within a cavity of the green tire T.

The tire mold 300 further includes a hot pressure medium supply (not shown), that injects a hot pressure medium such as steam into the bladder ring assembly 200 when the bladder ring assembly is in the axially compressed position. The injection of the hot pressure medium expands the bladder in a radial direction, thereby pressing the green tire T into an internal surface of the tire mold 300.

Figure 4:
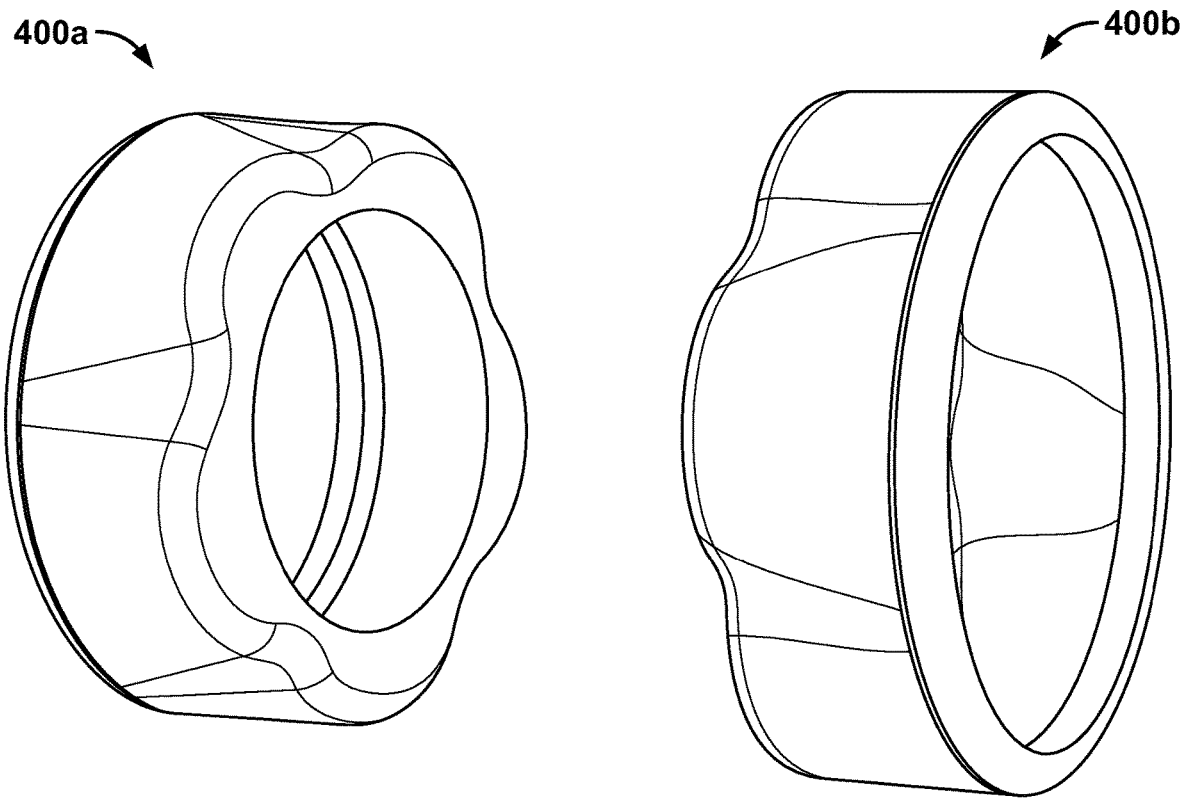
FIG. 4 illustrates a cutaway of an alternative embodiment of bladder rings.

FIG. 4 illustrates a cutaway of an alternative embodiment of bladder rings 400a,b. The bladder rings 400a,b are substantially the same as the bladder rings 220a,b described above with reference to FIGS. 2A-2B except for the differences described herein. Each of the bladder rings 400a,b has an outer, circular end and an inner end having a plurality of arches. The resulting geometry is a substantially cylindrical shape with undulating waves disposed about the annular surface. In the illustrated embodiment, the bladder rings 400a,b are arranged such that the arches of the opposing rings are offset. In an alternative embodiment, the bladder rings 400a,b are arranged such that the arches of the opposing rings are aligned. The bladder rings 400a,b may be rotated with respect to each other to be aligned at a desired orientation.

Figure 5:
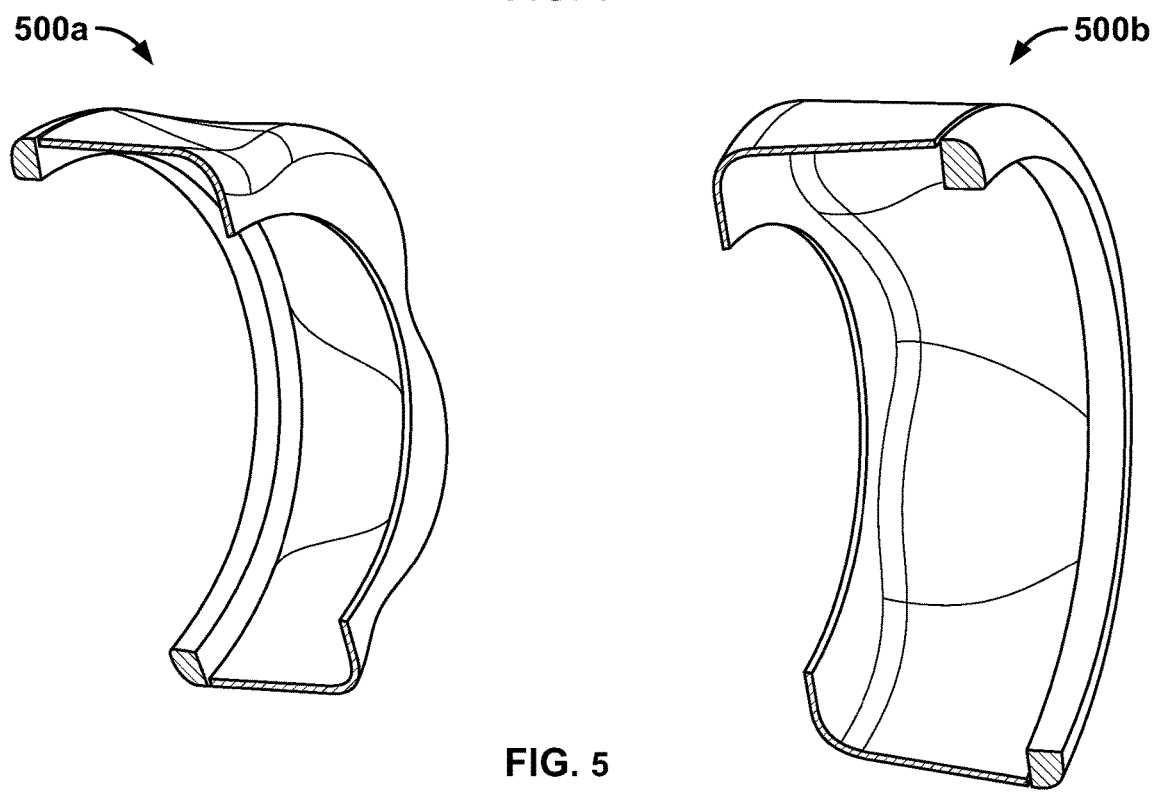
FIG. 5 illustrates a cutaway of another alternative embodiment of bladder rings.

FIG. 5 shows a cutaway of an alternative embodiment of bladder rings 500a,b. The bladder rings 500a,b are substantially the same as the bladder rings 220a,b, and 400a,b described above with reference to FIGS. 2A-2B, and 4 except for the differences described herein. Each of the bladder rings 500a,b has an outer, circular end. Additionally, a first bladder ring 500a has an inner end having a plurality of arches, while a second bladder ring 500b has a circular, inner end. In another alternative embodiment (not shown), both bladder rings have circular inner and outer rings. In yet another alternative embodiment (not shown), one or more additional bladder rings are disposed between the first and second bladder rings. In still another alternative embodiment (described in further detail below), the bladder rings may include a plurality of telescoping tubes.

Figure 6B:
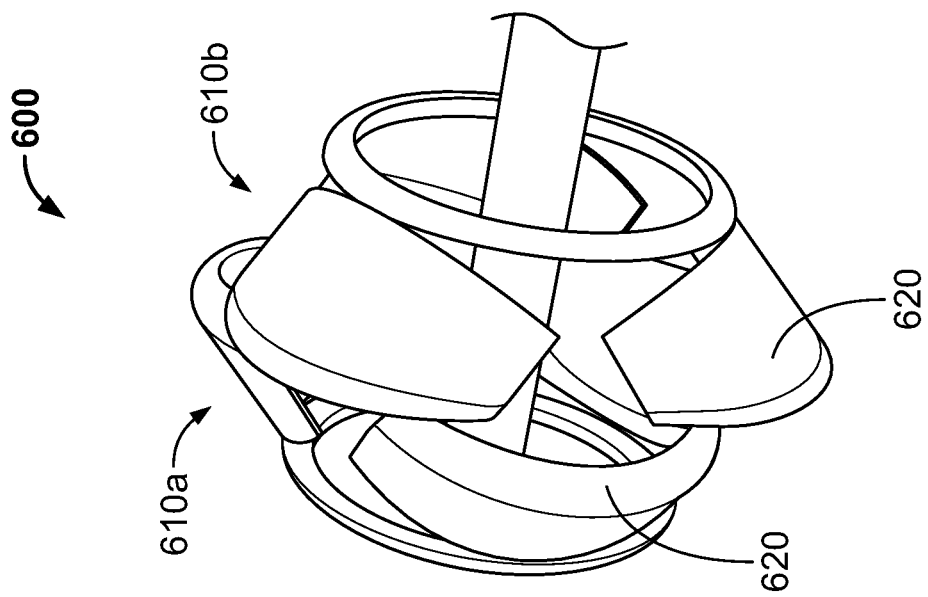
FIGS. 6A-6B illustrate a cutaway of an alternative embodiment of a bladder ring assembly, with the rings in extended and compressed positions, respectively.
Figure 6A:
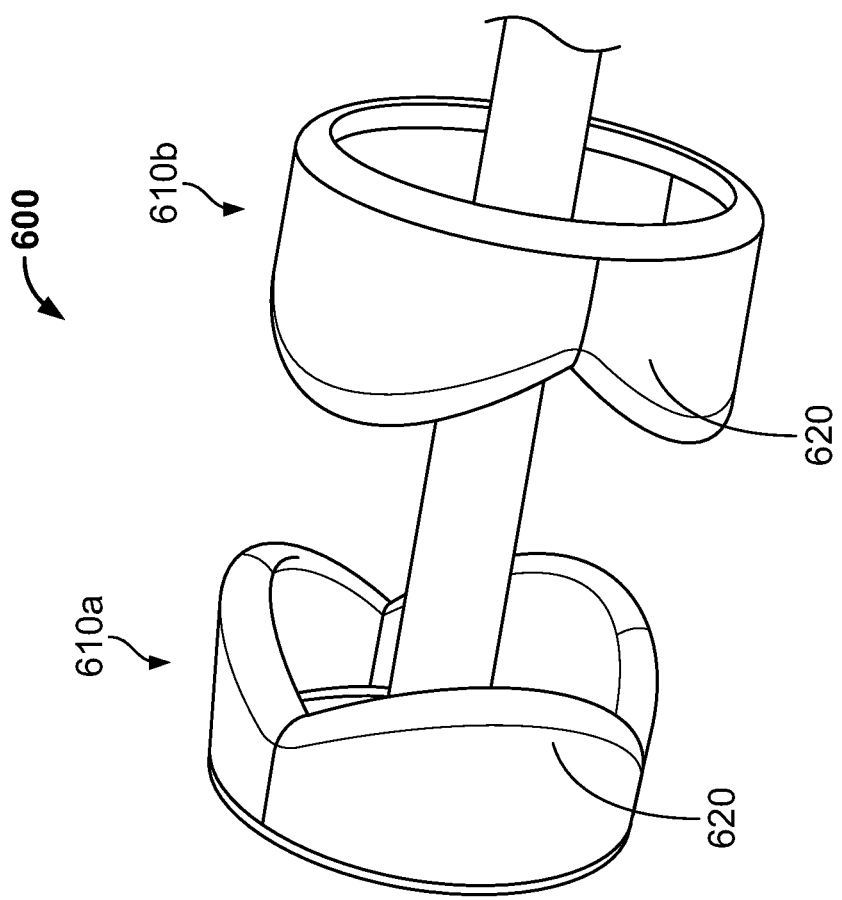

FIGS. 6A-6B show a cutaway of an alternative embodiment of a bladder ring assembly 600, with the rings in extended and compressed positions. The bladder ring assembly 600 is substantially the same as the bladder ring assembly 200 described above with reference to FIGS. 2A-2B except for the differences described herein. The bladder ring assembly 600 includes a first bladder ring 610a and a second bladder ring 610b, each having an annular surface formed by a plurality of discrete portions 620. Each of the discrete portions has a curved end, and therefore has a plurality of axial lengths. However, it should be understood that the axial length of the bladder rings 610a,b is defined by the maximum axial length of the discrete portions 620.

Each of the discrete portions 620 is hingedly connected to an outer end of one of the rings 610a,b. When the bladder ring assembly 600 is an axially extended position (as shown in FIG. 6A), the discrete portions 620 extend in a substantially axial direction. When the bladder rings 610a,b are moved towards each other, the discrete portions 620 of the opposing rings contact each other. When the bladder rings 610a,b are further moved to an axially compressed position (as shown in FIG. 6B), the discrete portions 620 of the opposing rings bias each other towards a radially outward position. Therefore, the discrete portions 620 may be referred to as articulating portions.

In the illustrated embodiment, the discrete portions 620 of opposing rings are offset such that the maximum axial length of one discrete portion is aligned with a minimum axial length of the opposing discrete portion. However, it should be understood that any orientation of the bladder rings may be employed.

Figure 7B:
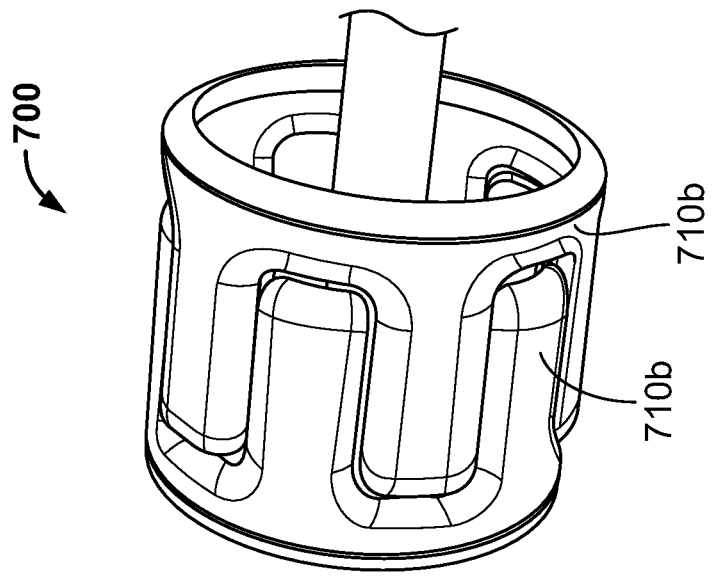
FIGS. 7A-7B illustrate a cutaway of another alternative embodiment of a bladder ring assembly, with the rings in extended and compressed positions, respectively.
Figure 7A:
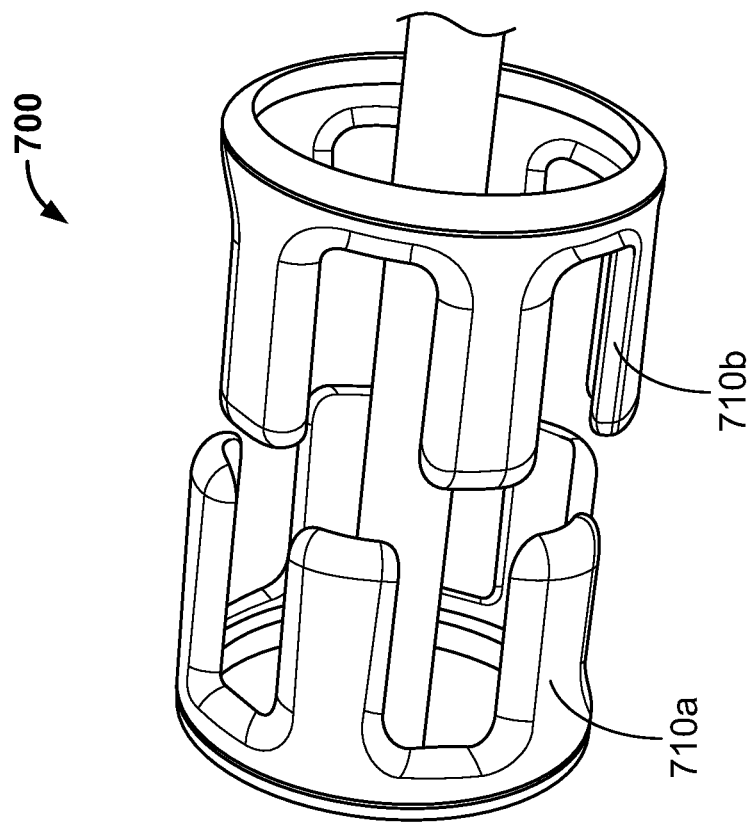

FIGS. 7A-7B show a cutaway of another alternative embodiment of a bladder ring assembly 700, with the rings in extended and compressed positions. The bladder ring assembly 700 is substantially the same as the bladder ring assembly 200 described above with reference to FIGS. 2A-2B except for the differences described herein. The bladder ring assembly 700 includes a first bladder ring 710a and a second bladder ring 710b, each having an annular surface with a plurality of axial lengths. However, it should be understood that the axial length of the bladder rings 710a,b is defined by the maximum axial length of each ring.

The opposing bladder rings 710a,b are offset such that the maximum axial length of a first ring 710a is aligned with a minimum axial length of a second ring 710b. In the illustrated embodiment, finger-like protrusions define the plurality of axial lengths. In other embodiments (not shown), the plurality of axial lengths may be defined by a wavy surface or other geometry.

Figure 8B:
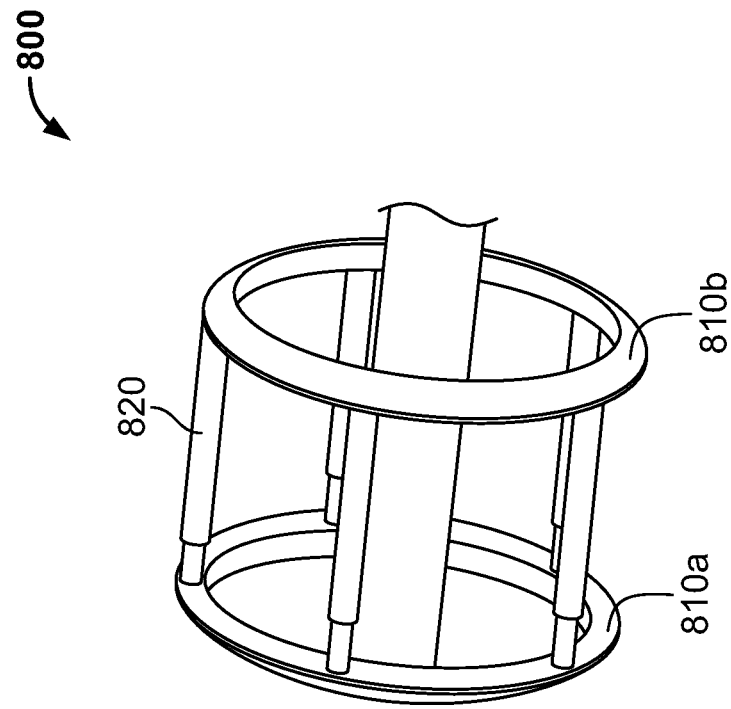
FIGS. 8A-8B illustrate a cutaway of another alternative embodiment of a bladder ring assembly, with the rings in extended and compressed positions, respectively.
Figure 8A:
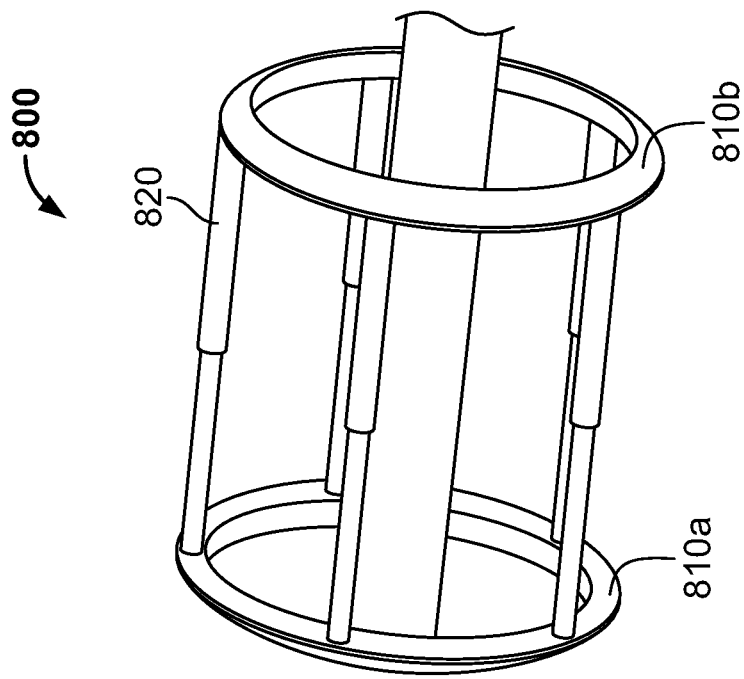

FIGS. 8A-8B show a cutaway of another alternative embodiment of a bladder ring assembly 800, with the rings in extended and compressed positions. The bladder ring assembly 800 is substantially the same as the bladder ring assembly 200 described above with reference to FIGS. 2A-2B except for the differences described herein. The bladder ring assembly 800 includes a first bladder ring 810a and a second bladder ring 810b, with a plurality of telescoping arms 820 extending there-between. In the illustrated embodiment, five telescoping arms are employed. In an alternative embodiment (not shown), two, three, or four telescoping arms are employed. In another alternative embodiment (not shown), six or more telescoping arms are employed. The number of telescoping arms may be selected according to the size of the bladder rings. For example, it may be desirable to have more telescoping arms around larger bladder rings.

In the illustrated embodiment, the telescoping arms 820 are substantially cylindrical tubes including a large diameter portion that receives a small diameter portion. While only two pieces are illustrated for each telescoping arm, it should be understood that three or more telescoping pieces may be nested inside the telescoping arms. In one known embodiment, the telescoping arms include three to six nested pieces. However, it should be understood that any number of nested pieces may be employed.

The diameter of the telescoping arms may be selected according to the size of the bladder rings 810. In alternative embodiments (not shown), the cross-sections of the telescoping arms may be square, rectangular, pentagonal, hexagonal, oval, or any other geometric shape. In other alternative embodiments (not shown), the telescoping arms may have open geometries. For example, without limitation, the telescoping arms may be C-shaped or L-shaped, or even have a planar geometry.

In one embodiment, a first end of each telescoping arm 820 is attached to the first bladder ring 810a and a second end of the telescoping arm is attached to the second bladder ring 810b. In such an embodiment, the telescoping arms 820 are in a compressed state when the bladder rings 810a,b are in the compressed position, and the telescoping arms 820 are pulled into an extended state when the bladder rings 810a,b are moved to an extended state.

In an alternative embodiment, the first end of each telescoping arm 820 is attached to the first bladder ring 810a, but second end of the telescoping arm is left free. In such an embodiment, the first bladder ring 810a is an upper ring that is above the second bladder ring 810b, and when the bladder rings 810a,b move to an extended position, gravity causes the telescoping arms to extend downwards.

In one embodiment (not shown), the telescoping arms are mounted to rotatable rings that are mounted to the bladder rings. In such an embodiment, the rotatable rings may be rotated after a predetermined number of uses. Rotating in this manner may prevent the bladder from repeated stresses in the same locations.

In another alternative embodiment (not shown), the telescoping arms may be replaced with folding arms. Such folding arms may be constructed of a flexible material.

Alternatively, the folding arms may be constructed of a plurality of rigid members that are hingedly connected.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire vulcanization mold comprising:
a plurality of mold surfaces defining a tire cavity;
a center post disposed in the tire cavity;
a first ring disposed about the center post, the first ring having a first rigid outer surface defining a first diameter and having a first axial length;
a second ring disposed about the center post, the second ring having a second rigid outer surface defining a second diameter equal to the first diameter, and having a second axial length;
a bladder having a first end connected to the first ring and a second end connected to the second ring,
    wherein at least one of the first and second rings is configured to move axially along the center post between a first, extended position in which the first ring is distal from the second ring and a second, compressed position in which the first ring is proximate to the second ring, and
    wherein, when the first and second rings are in the first, extended position the sum of the first axial length and second axial length is greater than a space between the first ring and the second ring;
a vacuum configured to apply vacuum pressure to an inside of the bladder such that the bladder contacts an axially inner portion and an axially outer portion of the first ring and an axially inner portion and an axially outer portion of the second ring when the first and second rings are in the first, extended position; and
a hot pressure medium supply configured to provide a hot pressure medium to the inside of the bladder such that the bladder contacts the axially outer portion of the first ring and the axially outer portion of the second ring when the first and second rings are in the second, compressed position, and such that the bladder does not contact the axially inner portion of the first ring and the axially inner portion of the second ring when the first and second rings are in the second, compressed position.

2. The tire vulcanization mold of claim 1, wherein the first ring contacts the second ring when the first and second rings are in the second, compressed position.

3. The tire vulcanization mold of claim 1, wherein the first ring is stationary with respect to the center post and the second ring translates along the center post.

4. The tire vulcanization mold of claim 1, wherein a ratio of the first diameter to the first axial length is less than 4:1, and a ratio of the second diameter to the second axial length is less than 4:1.

5. A tire mold having a cavity configured to receive a green tire, the tire mold comprising:
a flexible bladder disposed in a central portion of the cavity;
a first ring connected to a first end of the flexible bladder, the first ring having a first axial inner portion and a first axial outer portion separated by a first axial length; and
a second ring connected to a second end of the flexible bladder, the second ring having a second axial inner portion and a second axial outer portion separated by a second axial length,
    wherein at least one of the first and second rings is configured to move between a first position and a second position,
    wherein the flexible bladder is stretched to a maximum axial length when the first and second rings are in the first position,
    wherein the flexible bladder contacts the first axial inner portion and the first axial outer portion of the first ring and the second axial inner portion and the second axial outer portion of the second ring when the first and second rings are in the first position,
    wherein the flexible bladder contacts the first axial outer portion of the first ring and the second axial outer portion of the second ring when the first and second rings are in the second position,
    wherein the flexible bladder does not contact the first axial inner portion of the first ring or the second axial inner portion of the second ring when the first and second rings are in the second position, and
    wherein, when the first and second rings are in the first position the sum of the first axial length and second axial length is greater than a space between the first ring and the second ring.

6. The tire mold of claim 5, further comprising a vacuum configured to apply vacuum pressure to an inside of the flexible bladder when the first and second rings are in the first position.

7. The tire mold of claim 5, wherein the first axial length is at least 40% of the maximum axial length of the flexible bladder.

8. The tire mold of claim 7, wherein the second axial length is at least 40% of the maximum axial length of the flexible bladder.

* * * * *